US 9,950,787 B2

(12) United States Patent
Bammer

(10) Patent No.: US 9,950,787 B2
(45) Date of Patent: Apr. 24, 2018

(54) CONTROL SYSTEM FOR CONTROLLING COLLECTIVE AND CYCLIC PITCH OF ROTOR BLADES OF A MULTI-BLADE ROTOR IN A ROTARY-WING AIRCRAFT

(71) Applicant: AIRBUS HELICOPTERS DEUTSCHLAND GMBH, Donauworth (DE)

(72) Inventor: Benedikt Bammer, Schliersee (DE)

(73) Assignee: AIRBUS HELICOPTERS DEUTSCHLAND GMBH, Donauworth (DE)

(*) Notice: Subject to any disclaimer, the term of this patent is extended or adjusted under 35 U.S.C. 154(b) by 501 days.

(21) Appl. No.: 14/811,962

(22) Filed: Jul. 29, 2015

(65) Prior Publication Data
US 2016/0031557 A1 Feb. 4, 2016

(30) Foreign Application Priority Data

Jul. 31, 2014 (EP) .................................... 14400042

(51) Int. Cl.
B64C 27/605 (2006.01)
B64C 11/32 (2006.01)

(52) U.S. Cl.
CPC .......... B64C 27/605 (2013.01); B64C 11/325 (2013.01)

(58) Field of Classification Search
CPC ............................... B64C 27/605; B64C 11/30
See application file for complete search history.

(56) References Cited

U.S. PATENT DOCUMENTS

| 2,670,804 | A |   | 3/1954  | Campbell               |
|-----------|---|---|---------|------------------------|
| 3,007,530 | A |   | 11/1961 | Doman et al.           |
| 3,508,841 | A |   | 4/1970  | Derschmidt             |
| 4,630,998 | A |   | 12/1986 | Leman et al.           |
| 5,599,167 | A | * | 2/1997  | Daldosso ..... B64C 27/605 416/108 |
| 6,033,182 | A | * | 3/2000  | Rampal ..... B64C 27/605 244/17.25 |
| 6,280,141 | B1| * | 8/2001  | Rampal ..... B64C 27/605 416/114 |

(Continued)

FOREIGN PATENT DOCUMENTS

DE 8514910 11/1986

OTHER PUBLICATIONS

Chinese First Office Action dated Dec. 2, 2016, Application No. 201510387386.0, Applicant Airbus Helicopters, 13 Pages.

(Continued)

Primary Examiner — Logan Kraft
Assistant Examiner — Sabbir Hasan
(74) Attorney, Agent, or Firm — Brooks Kushman P.C.

(57) ABSTRACT

The invention is related to a control system for controlling collective and cyclic pitch of rotor blades of a multi-blade rotor 1a in a rotary-wing aircraft, the control system comprising a swash plate assembly with at least one non-rotating plate and at least one rotating plate that is mounted rotatably to the at least one non-rotating plate, the at least one rotating plate and the at least one non-rotating plate being mounted to a non-rotating sliding sleeve, wherein a spherical bearing is provided on the non-rotating sliding sleeve, wherein at least one non-rotating stop arm is provided for non-rotatably connecting the at least one non-rotating plate to the non-rotating sliding sleeve.

20 Claims, 3 Drawing Sheets

(56) References Cited

U.S. PATENT DOCUMENTS

| | | |
|---|---|---|
| 7,037,072 B2 | 5/2006 | Carson |
| 8,142,158 B2 * | 3/2012 | Schmaling ............ B64C 27/605 |
| | | 416/149 |
| 2007/0128037 A1 | 6/2007 | Schmaling et al. |

OTHER PUBLICATIONS

Korean First Office Action dated Aug. 22, 2016, Application No. 1020150078761, Applicant Airbus Helicopters, 10 Pages.
Canadian First Office Action dated Apr. 22, 2016, Application No. 2,889,319, Applicant Airbus Helicopters, 3 Pages.
Japanese First Office Action dated Jun. 27, 2016, Application No. 2015088733, Applicant Airbus Helicopters, 6 Pages.
European Search Report for European Application No. 14400042, Completed by the European Patent Office dated Jan. 14, 2015, 6 Pages.

* cited by examiner

CONTROL SYSTEM FOR CONTROLLING COLLECTIVE AND CYCLIC PITCH OF ROTOR BLADES OF A MULTI-BLADE ROTOR IN A ROTARY-WING AIRCRAFT

CROSS REFERENCE TO RELATED APPLICATION

This application claims priority to European patent application No. 14 400042.9 filed on Jul. 31, 2014, the disclosure of which is incorporated in its entirety by reference herein.

BACKGROUND OF THE INVENTION (1) Field of the Invention

The invention is related to a control system for controlling collective and cyclic pitch of rotor blades of a multi-blade rotor in a rotary-wing aircraft, said control system having a swash plate assembly and comprising the features of claim 1.

(2) Description of Related Art

A control system for controlling collective and cyclic pitch of rotor blades of a multi-blade rotor in a rotary-wing aircraft, in particular of rotor blades of a main rotor in a helicopter, is used in operation for rotating the rotor blades integrally around associated blade pitch control longitudinal axes by means of suitable pitch levers associated with the rotor blades that are operated by corresponding pitch control rods. Each pitch control rod is, therefore, connected to a rotating plate rotating in operation with and around a rotor axis of the rotor. This rotating plate is mounted to rotate on a non-rotating plate, which is restrained against any rotation around the rotor axis of the rotor by a connection connecting the non-rotating plate to a non-rotatable underlying structure of the rotary-wing aircraft, such as its fuselage or main gear box.

The rotating plate and the non-rotating plate define a so-called swash plate assembly and are usually annular and surround the rotor axis. This swash plate assembly is activatable by means of a suitable control input unit via associated control actuators for respectively controlling the collective pitch and the cyclic pitch of the rotor blades. More specifically, the swash plate assembly is adapted to transfer control inputs from a non-rotating system that includes the suitable control input unit and the non-rotating plate to a rotating system that includes the rotating plate and, when being mounted to the rotary-wing aircraft, also the rotor blades of the multi-blade rotor, i.e. the rotatable rotor as such.

In bigger rotary-wing aircrafts, the associated control actuators are frequently embodied by three servo-controlled jacks or similar actuators placed between the swash-plates and the non-rotatable underlying structure of the rotary-wing aircraft. These servo controlled jacks or similar actuators are respectively articulated by ball joints at their lower and upper ends on this non-rotatable underlying structure and in clevises of the non-rotating plate. Accordingly, spatial orientation of the non-rotating plate is controllable, wherein said non-rotating plate is adapted to entrain said rotating plate in tilting movements, i.e. for determining the spatial orientation of said rotating plate, which is connected to the pitch levers of the rotor blades by means of the pitch control rods. These pitch control rods extend between the rotating plate and the pitch levers and are respectively articulated by ball joints at their upper and lower ends on the pitch levers and in clevises that are distributed at the periphery of the rotating plate.

The rotating and non-rotating plates are usually displaceable axially parallel to the rotor axis for controlling collective pitch, and they can be tilted in any direction around the rotor axis for controlling cyclic pitch, by means of an axially displaceable central spherical bearing. The latter, on which the non-rotating plate is mounted in an oscillating manner, is generally centered on the rotor axis.

The document U.S. Pat. No. 3,508,841 A describes such a control system with a central spherical bearing on which a non-rotating plate of a swash plate assembly is mounted. The spherical bearing is mounted to a non-rotating sliding sleeve, wherein a rotor shaft of an associated rotor is rotatably received. This non-rotating sliding sleeve can be displaced axially parallel to a rotor axis of the rotor for controlling collective pitch, while rotating and non-rotating plates of this control system can be tilted in any direction around the rotor axis for controlling cyclic pitch.

In other known control systems, the spherical bearing is mounted axially displaceable parallel to the rotor axis around a cylindrical guide, which is arranged coaxially and non-rotatably to the rotor axis and generally fixed in relation to the non-rotatable underlying structure of the rotary-wing aircraft. When the rotating and non-rotating plates surround the rotor shaft, which is most often the case, the cylindrical guide is tubular, surrounds the rotor shaft and is rigidly fixed to a housing secured to the non-rotatable underlying structure of the rotary-wing aircraft.

The rotating plate is usually connected to the rotor by means of a suitable torque link in the form of one or more rotating arms, such that the latter entrain the rotating plate to rotation around the rotor axis in operation. The non-rotating plate, in turn, is non-rotatably connected as described above to the non-rotatable underlying structure of the rotary-wing aircraft by means of a suitable stop arm that inhibits relative rotational movement between the non-rotating plate and the non-rotatable underlying structure of the rotary-wing aircraft.

The document U.S. Pat. No. 5,599,167 A describes such a control system with a rotating plate that is driven in rotation by a rotor shaft of an associated main rotor with the aid of one or more torque links that are embodied as so-called rotating scissors fittings, which are articulated by one end to the rotor shaft and by the other end to the rotating plate. The latter is additionally mounted so that it can rotate, with the aid of a ball-bearing, coaxially on a non-rotating plate that can be tilted in any direction around a rotor axis of the rotor shaft, while being mounted to a central spherical bearing. This central spherical bearing can be displaced parallel to the rotor axis by an axial sliding of the central spherical bearing about a cylindrical tubular guide, which cannot rotate as it is non-rotatably fixed to stationary points of a non-rotatable underlying structure. The non-rotating plate of the control system is held back against any rotation about the rotor axis by a so-called non-rotating scissors fitting, which is articulated by one end to the non-rotating plate and by the other to the base of the cylindrical tubular guide.

The document U.S. Pat. No. 6,033,182 A also describes such a control system with a rotating plate. However, the latter is connected to an associated rotor by means of two torque links, which are embodied as scissor-articulated rotating arms, each having an upper and a lower arm that are pivot hinged onto each other, the lower arm being connected by a ball joint onto the rotating plate and the upper arm being pivotably mounted to a clevis of a torque link driver provided on a rotor shaft of the associated rotor. The non-rotating plate of the control system is non-rotatably connected to a non-rotatable underlying structure by means of a suitable stop arm, which is embodied as a rigid arm that is fixed on an external radial support provided integrally with a conical housing that is non-rotatably attached to the non-rotatable underlying structure. The stop arm is integral with the non-rotatable underlying structure and comprises an axial arm part with a "U" shaped transverse section delimiting a groove that forms a rigid rotation stop track of a stop pin that is integral with the non-rotating plate.

However, the stop arms of the above described control systems must be configured comparatively long in order to allow connection of the non-rotating plate to the non-rotatable underlying structure of the rotary-wing aircraft. This comparatively long configuration requires a comparatively high rigidity of the stop arms and, consequently, a comparatively heavy weight. Another disadvantage consists in a resulting aerodynamic drag in operation, which is naturally higher when using such large stop arms.

While the control systems of bigger rotary-wing aircrafts frequently use spherical bearings as described above, control systems of some smaller and mid-size rotary-wing aircrafts use gimbals with e.g. cardan-joint or u-joint rings for mounting at least a non-rotating plate of a swash plate assembly of the control system in an oscillating manner. The gimbals can be mounted on associated sliding sleeves, which are glidingly arranged on cylindrical tubular guides that surround rotor shafts of associated rotors.

In such control systems, corresponding control inputs to the swash plate assembly can be mixed by a control input unit that is embodied e.g. as a so-called mixing lever gear unit and arranged underneath the swash plate assembly. For collective pitch control, the sliding sleeve can be displaced axially parallel to a rotor axis of the associated rotor by a mixing lever gear unit fork of the mixing lever gear unit. In this case, a stop arm or scissor between the non-rotating plate of the control system and a non-rotatable underlying structure of the rotary-wing aircraft is not required, as the non-rotating plate can be rigidly fixed by the gimbal ring to the sliding sleeve, which, in turn, is conjoined with the mixing lever gear unit fork.

The document U.S. Pat. No. 7,037,072 B2 describes a control system with a central gimbal that is centered on a rotor axis of a rotor shaft of an associated rotor. The central gimbal, on which the rotating and non-rotating plates of an associated swash plate assembly are mounted in an oscillating manner, is rigidly fixed, i.e. in an axially immobile manner, to a collar, which is arranged coaxially to the rotor axis and rigidly and non-rotatably attached to a non-rotatable underlying structure.

BRIEF SUMMARY OF THE INVENTION

Accordingly, the rotating and non-rotating plates can only be tilted in any direction around the rotor axis for controlling cyclic pitch by means of the gimbal. Nevertheless, this control system is not suitable to allow for collective pitch control.

However, such gimbals are comparatively heavy, thereby increasing an overall weight of a given rotary-wing aircraft. In particular, gimbals are much heavier than comparable spherical bearings, as e.g. a cardan-joined gimbal requires four bearings with a plurality of fixation bolts.

It is, therefore, an object of the present invention to provide a new control system for controlling collective and cyclic pitch of rotor blades of a multi-blade rotor in a rotary-wing aircraft, wherein a swash plate assembly is mounted to a spherical bearing in an oscillating manner, said new control system comprising a reduced weight compared to conventional control systems with spherical bearings.

This object is solved by a control system for controlling collective and cyclic pitch of rotor blades of a multi-blade rotor in a rotary-wing aircraft, said control system comprising the features of claim 1.

More specifically, according to the invention a control system for controlling collective and cyclic pitch of rotor blades of a multi-blade rotor in a rotary-wing aircraft comprises a swash plate assembly with at least one non-rotating plate and at least one rotating plate that is mounted rotatably to said at least one non-rotating plate. Said multi-blade rotor comprises a rotor shaft that defines an associated rotor axis. Said at least one rotating plate and said at least one non-rotating plate are mounted to a non-rotating sliding sleeve that is adapted to be mounted axially displaceable parallel to said associated rotor axis on said rotor shaft.

A spherical bearing is provided on said non-rotating sliding sleeve, said at least one rotating plate being rotatable around an associated sliding sleeve axis and being mounted with said at least one non-rotating plate to said spherical bearing such that said at least one rotating plate and said at least one non-rotating plate are tiltable in any direction around said associated sliding sleeve axis by means of said spherical bearing. At least one non-rotating stop arm is provided for non-rotatably connecting said at least one non-rotating plate to said non-rotating sliding sleeve in order to inhibit relative rotational movement around said associated sliding sleeve axis between said at least one non-rotating plate and said non-rotating sliding sleeve, said at least one non-rotating stop arm being mounted to said at least one non-rotating plate and to said non-rotating sliding sleeve.

The inventive control system comprises a swash plate assembly that is mounted to a spherical bearing having a ball that is arranged on a non-rotating sliding sleeve. Such a spherical bearing is much simpler, has less parts and is lighter than a gimbal, i.e. a cardan-joint or u-joint.

Preferably, the non-rotating plate of the swash plate assembly is mounted to the ball of the spherical bearing such that is can be tilted in any direction around an associated sliding sleeve axis of the non-rotating sliding sleeve. As this mounting allows one degree of freedom to the non-rotating plate for rotation around the ball, i.e. the spherical bearing, at least one non-rotating stop arm is provided to inhibit such a rotation.

This non-rotating stop arm is, however, not adapted to be fixed on a non-rotatable underlying structure of a given rotary-wing aircraft, such as a main gear box or a cylindrical tubular guide that is rigidly attached to a fuselage of the rotary-wing aircraft. Instead, the non-rotating stop arm is arranged in the non-rotating system of the control system and, therein, preferably non-rotatably attached to the non-rotating sliding sleeve and the non-rotating plate. Thus, motion of the non-rotating stop arm, i.e. extensions or retractions, advantageously only occurs in cyclic pitch control, but not in collective pitch control, where the non-rotating stop arm is entirely moved together with the non-rotating sliding sleeve and the non-rotating plate. Consequently, as the non-rotating stop arm is only required to perform cyclic motion in operation, it's durability can be prolonged.

Furthermore, as a corresponding cyclic motion is generally performed with respect to comparatively small tilting angles of the non-rotating plate, a comparatively short, small and light-weight non-rotating stop arm can be provided. Accordingly, material required for manufacturing of the non-rotating stop arm can be economized so that the overall manufacturing costs of the non-rotating stop arm can be decreased advantageously.

Moreover, due to these comparatively small tilting angles, the non-rotating stop arm can be implemented by means of a flexible link according to one aspect. Advantageously, such a flexible link can be manufactured using composite material, thereby resulting in a simple, light weight and inexpensive non-rotating stop arm.

According to a further preferred embodiment, said at least one non-rotating stop arm comprises at least a first and a second stop arm section, said first stop arm section being connected to said second stop arm section by an associated stop arm hinge.

According to a further preferred embodiment, said first stop arm section is mounted to said at least one non-rotating plate by means of an associated stop arm spherical bearing.

According to a further preferred embodiment, said second stop arm section is mounted to said non-rotating sliding sleeve by means of an associated stop arm pivot bearing.

According to a further preferred embodiment, a non-rotating sliding sleeve guide is provided, said non-rotating sliding sleeve being glidingly arranged on said non-rotating sliding sleeve guide.

According to a further preferred embodiment, said rotor shaft of said multi-blade rotor extends through said non-rotating sliding sleeve guide.

According to a further preferred embodiment, said non-rotating sliding sleeve guide is adapted for rigid fixation to a non-rotating part of said rotary-wing aircraft, in particular to a main gear box of said rotary-wing aircraft.

According to a further preferred embodiment, at least one fork unit is provided for controlling axial displacement of said non-rotating sliding sleeve in operation, said at least one fork unit being rotatably connected by means of a pivotable connection to a mounting part of said non-rotating sliding sleeve by means of an associated fork pivot bearing.

According to a further preferred embodiment, said at least one non-rotating stop arm is mounted to said at least one non-rotating plate and to a fork mounting point or said associated fork pivot bearing.

According to a further preferred embodiment, said at least one non-rotating stop arm is mounted to said at least one non-rotating plate and to said mounting part.

According to a further preferred embodiment, at least one actuator arm is provided for controlling tilting of said at least one rotating plate and said at least one non-rotating plate in operation, said at least one actuator arm being pivotally connected to said at least one fork unit by means of an associated actuator arm pivot bearing.

According to a further preferred embodiment, said at least one actuator arm is connected to said at least one non-rotating plate by means of associated swash plate control rods.

According to a further preferred embodiment, said at least one actuator arm and said at least one fork unit define a control input unit, in particular a mixing lever gear unit.

Advantageously, use of such a mixing lever gear unit allows for reducing an overall height of the control system. Accordingly, an overall height of the multi-blade rotor as such can be reduced, thereby saving material, weight and manufacturing costs. Also, use of such a mixing lever gear unit allows for reducing an overall number of constituent components of the control system, as e.g. hydraulic hoses that are required for driving conventionally used actuators are now redundant. Thus, complexity of the control system can be reduced advantageously, thereby leading to a further decrease in manufacturing costs.

Furthermore, use of such a mixing lever gear unit enables omission of a mixing unit on an upper deck of the fuselage of the rotary-wing aircraft, which is otherwise mandatory for direct actuation of the non-rotating plate of the swash plate assembly. Thus, space on the upper deck can be freed and is, therefore, available for other technical equipment.

Moreover, use of such a mixing lever gear unit allows reduction of required control forces that must be applied by a pilot of the rotary-wing aircraft, as a corresponding mixing of the controls occurs only after the actuators. However, in contrast thereto the mixing in mixing units that are embodied for direct actuation of the non-rotating plate of the swash plate assembly occurs before the actuators, thus, resulting in greater required control forces.

According to a further preferred embodiment, said at least one rotating plate is connected to each one of the rotor blades by means of an associated pitch control rod.

According to a further preferred embodiment, said at least one rotating plate is rotatably connectable to said rotor shaft of said multi-blade rotor by means of at least one associated rotating arm in order to allow rotational movement of said at least one rotating plate together with said rotor shaft.

According to a further preferred embodiment, said at least one rotating plate defines an upper swash plate and that said at least one non-rotating plate defines a lower swash plate of said swash plate assembly.

According to a further preferred embodiment, said at least one non-rotating stop arm comprises composite material.

The present invention further provides a rotary-wing aircraft with a multi-blade rotor having a plurality of rotor blades and a rotor shaft that defines an associated rotor axis. Said rotary-wing aircraft comprises a control system for controlling collective and cyclic pitch of said plurality of rotor blades. Said control system comprises a swash plate assembly with at least one non-rotating plate and at least one rotating plate that is mounted rotatably to said at least one non-rotating plate. Said at least one rotating plate and said at least one non-rotating plate are mounted to a non-rotating sliding sleeve that is axially displaceable parallel to said rotor axis of said multi-blade rotor.

A spherical bearing is provided on said non-rotating sliding sleeve, said at least one rotating plate being rotatable around said rotor axis and being mounted with said at least one non-rotating plate to said spherical bearing such that said at least one rotating plate and said at least one non-rotating plate are tiltable in any direction around said rotor axis by means of said spherical bearing. At least one non-rotating stop arm is provided for non-rotatably connecting said at least one non-rotating plate to said non-rotating sliding sleeve in order to inhibit relative rotational movement around said associated sliding sleeve axis between said at least one non-rotating plate and said non-rotating sliding sleeve, said at least one non-rotating stop arm being mounted to said at least one non-rotating plate and to said non-rotating sliding sleeve.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
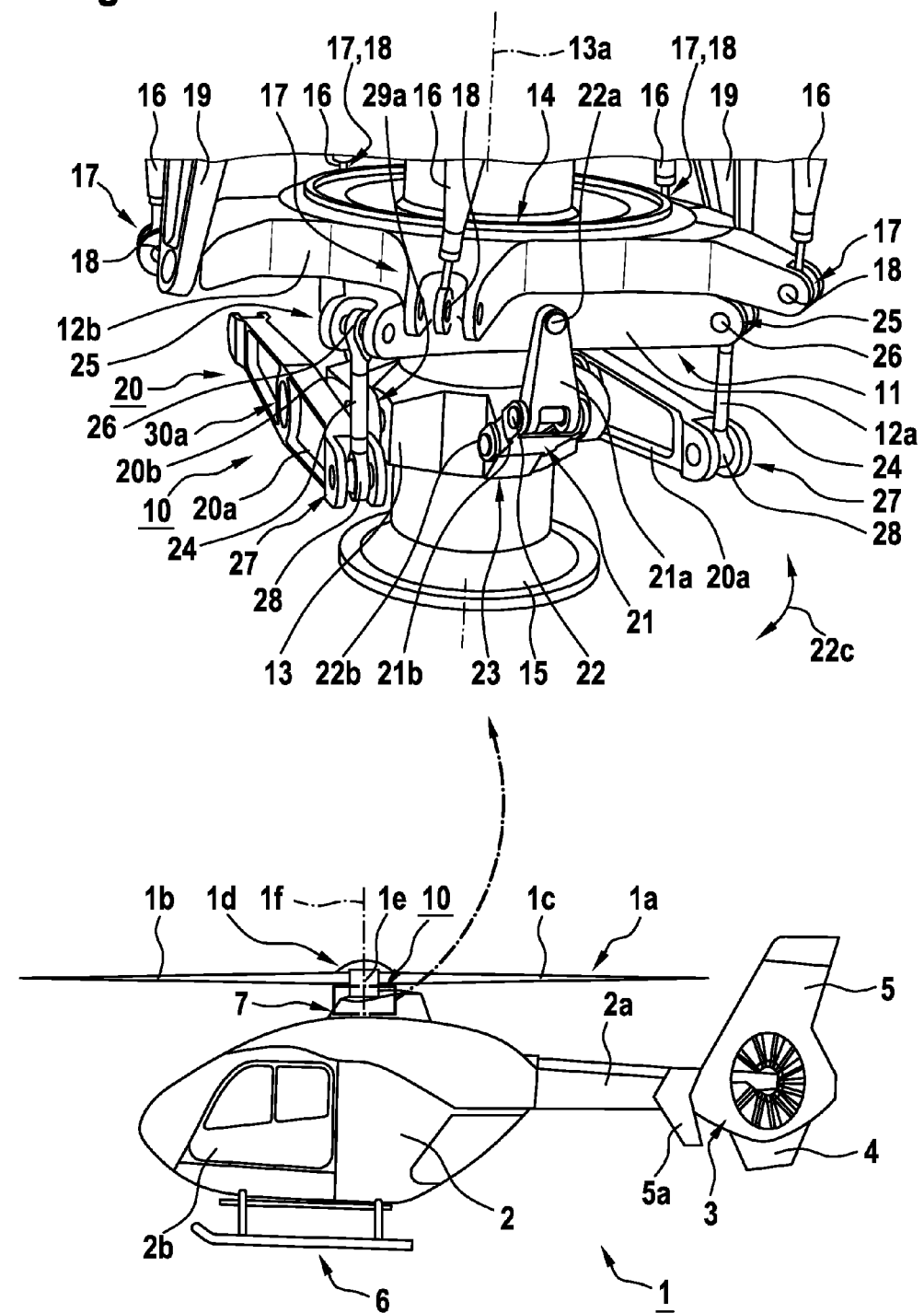
FIG. 1 shows a lateral view of a rotary-wing aircraft with an inventive control system and an enlarged perspective view of the control system according to the invention.

FIG. 1 shows a rotary-wing aircraft 1 with a fuselage 2 that is connected to a landing gear 6, said fuselage 2 defining a tail boom 2a and a cabin 2b. The rotary-wing aircraft 1 comprises at least one multi-blade rotor 1a for providing lift and forward or backward thrust during operation. The at least one multi-blade rotor 1a comprises a plurality of rotor blades 1b, 1c that are mounted at an associated rotor head 1d to a rotor shaft 1e, which rotates in operation of the rotary-wing aircraft 1 around an associated rotor axis 1f.

By way of example, the rotary-wing aircraft 1 is embodied as a helicopter, which comprises at least one preferentially shrouded counter-torque device 3 configured to provide counter-torque during operation, i.e. to counter the torque created by rotation of the at least one multi-blade rotor 1a for purposes of balancing the rotary-wing aircraft 1 in terms of yaw. The at least one counter-torque device 3 is illustratively provided at an aft section of the tail boom 2a, which preferably further comprises a bumper 4, a tail wing 5a and a fin 5. The tail wing 5a is preferably adjustable in its inclination and can, thus, overtake the functioning of a horizontal stabilizer. Alternatively, or in addition, the rotary-wing aircraft 1 is provided with a suitable horizontal stabilizer.

However, it should be noted that the at least one counter-torque device 3, the tail wing 5a as well as the fin 5 with the bumper 4 provided at the aft section of the tail boom 2a are merely described for illustrating one exemplary embodiment of the rotary-wing aircraft 1 and not for limiting the invention accordingly. Instead, the present invention as described hereinafter can likewise be applied to any rotary-wing aircraft and, in particular, any helicopter, independent of a respective construction of the aft section thereof.

According to one aspect, the rotary-wing aircraft 1 comprises a control system 10 for controlling collective and cyclic pitch of the rotor blades 1b, 1c of the at least one multi-blade rotor 1a. The control system 10, which is further detailed in an enlarged perspective detail view, is preferentially arranged between the rotor head 1d of the at least one multi-blade rotor 1a and a main gear box 7 of the rotary-wing aircraft 1.

Preferably, the control system 10 comprises a swash plate assembly 11 with at least one non-rotating plate 12a and at least one rotating plate 12b that is mounted rotatably to the at least one non-rotating plate 12a. Illustratively, the at least one rotating plate 12b defines an upper swash plate and the at least one non-rotating plate 12a defines a lower swash plate of this swash plate assembly 11.

The at least one non-rotating and rotating plates 12a, 12b are preferably at least partly disk-shaped and connected to each other by means of an associated roller or ball bearing that allows relative rotational movement between these plates 12a, 12b. In this configuration, the at least one non-rotating and rotating plates 12a, 12b are preferably mainly superposed. However, they can also, or alternatively, be at least partly ring-shaped. In such a configuration, the at least one rotating plate 12b mainly encompasses the at least one non-rotating plate 12a.

According to one aspect, the at least one rotating plate 12b and the at least one non-rotating plate 12a are mounted to a non-rotating sliding sleeve 13 having an associated sliding sleeve axis 13a. This non-rotating sliding sleeve 13 is preferably adapted to be, and illustratively is, mounted axially displaceable parallel to the rotor axis 1f on the rotor shaft 1e.

Preferably, the non-rotating sliding sleeve 13 is glidingly arranged on a non-rotating sliding sleeve guide 15. This non-rotating sliding sleeve guide 15 is adapted for accommodating at least partly the rotor shaft 1e of the at least one multi-blade rotor 1a, which illustratively extends in its longitudinal extension through said non-rotating sliding sleeve guide 15. Furthermore, the non-rotating sliding sleeve guide 15 is adapted for rigid fixation to a non-rotating part of the rotary-wing aircraft 1. Illustratively, the non-rotating sliding sleeve guide 15 is rigidly attached to the main gear box 7 of the rotary-wing aircraft 1, e.g. by means of screwing, bolting or bonding.

According to one aspect, the at least one rotating plate 12b is rotatable around the associated sliding sleeve axis 13a of the non-rotating sliding sleeve 13 and mounted with the at least one non-rotating plate 12a to a spherical bearing 14 that is provided on the non-rotating sliding sleeve 13. For instance, the spherical bearing is embodied as a ball joint with a ball, which is rigidly attached to the non-rotating sliding sleeve 13 or integrally formed in one piece therewith.

Preferably, the at least one rotating plate 12b and the at least one non-rotating plate 12a are mounted to the spherical bearing 14 such that they are tiltable in any direction around the associated sliding sleeve axis 13a by means of said spherical bearing 14. Allowable tilting angles between the associated sliding sleeve axis 13a and the at least one non-rotating and rotating plates 12a, 12b preferentially do not exceed 20°.

The at least one rotating plate 12b is preferably connectable, and illustratively connected, to each one of the rotor blades 1b, 1c by means of an associated pitch control rod 16. Therefore, external radial clevises 17, equal in number to the rotor blades 1b, 1c, are distributed over an external periphery of the at least one rotating plate 12b, preferentially evenly, and in each such external radial clevis 17 a ball joint 18 is held, which articulates a lower end of an associated pitch control rod 16, while its upper end can be articulated, and is illustratively articulated, in a pitch lever of an associated one of the rotor blades 1b, 1c, preferentially also in a ball joint. Furthermore, the at least one rotating plate 12b is at least indirectly rotatably connectable, and is illustratively connected, to the rotor shaft 1e of the multi-blade rotor 1a by means of at least one associated rotating torque link, which is by way of example embodied as a rotating arm 19.

For controlling tilting and/or axial displacement of the at least one rotating plate 12b and the at least one non-rotating plate 12a in operation, a control input unit 20 is provided. This control input unit 20 preferentially comprises two actuator arms 20a and at least one fork unit 20b, and is preferably embodied as a so-called mixing lever gear unit. Each actuator arm 20a is illustratively embodied as a lateral or outer arm of the control input unit 20 and preferably pivotally connected to the at least one fork unit 20b, which is illustratively embodied as an inner fork, by means of an associated actuator arm pivot bearing 30a.

The at least one actuator arm 20a is connected to the at least one non-rotating plate 12a by means of associated swash plate control rods 24 for controlling tilting of the at least one non-rotating plate 12a and, thus, of the at least one rotating plate 12b in any required tilting direction 22c around the rotor axis 1f, thereby performing cyclic pitch control of the rotor blades 1b, 1c. Therefore, external radial clevises 25, equal in number to the associated swash plate control rods 24, are provided on an external periphery of the at least one non-rotating plate 12a, and in each such external radial clevis 25 a ball joint 26 is held, which articulates an upper end of an associated swash plate control rod 24, while its lower end is articulated in a corresponding ball joint 28, which is held in a clevis 27 provided on an extremity of an associated actuator arm 20a.

The at least one fork unit 20b is provided for controlling axial displacement of the non-rotating sliding sleeve 13 in operation. Therefore, the at least one fork unit 20b is rotatably connected to a mounting part 23 of the non-rotating sliding sleeve 13 at a corresponding mounting point 29a by means of an associated fork pivot bearing (29b in FIG. 2). The mounting part 23 is illustratively formed at—or by—a lower section of the non-rotating sliding sleeve 13 that takes preferably up to a third of the overall length of said non-rotating sliding sleeve 1.

According to one aspect, at least one non-rotating stop arm 21 is provided for non-rotatably connecting the non-rotating sliding sleeve 13 to the at least one non-rotating plate 12a. This at least one non-rotating stop arm 21 is adapted to inhibit relative rotational movement between the at least one non-rotating plate 12a and the non-rotating sliding sleeve 13 around the associated sliding sleeve axis 13a. Therefore, the at least one non-rotating stop arm 21 is mounted to the at least one non-rotating plate 12a and, preferentially, directly to said non-rotating sliding sleeve 13. For instance, the at least one non-rotating stop arm 21 is mounted to the mounting part 23 of the non-rotating sliding sleeve 13.

However, it should be noted that the at least one non-rotating stop arm 21 must not necessarily be mounted directly to said non-rotating sliding sleeve 13, but can alternatively be mounted to any other non-rotatable part of the control system 10. For instance, the at least one non-rotating stop arm 21 can be mounted to the associated fork pivot bearing (29b in FIG. 2), the at least one fork unit 20b, the corresponding fork mounting point 29a, and so on.

Preferably, the at least one non-rotating stop arm 21 comprises at least a first and a second stop arm section 21a, 21b. Illustratively, the at least one first stop arm section 21a is embodied as an upper arm of the at least one non-rotating stop arm 21 and the at least one second stop arm section 21b is embodied as a lower arm thereof.

According to one aspect, the upper arm 21a is connected to the lower arm 21b by a first associated bearing, e.g. an associated stop arm hinge 22. The upper arm 21a is further mounted to the at least one non-rotating plate 12a by means of a second associated bearing, e.g. an associated spherical bearing 22a. The lower arm 21b is further mounted to the non-rotating sliding sleeve 13 by means of a third associated bearing, e.g. an associated pivot bearing 22b.

It should be noted that the above described configuration and fixation of the at least one non-rotating stop arm 21 is merely described for purposes of illustration and not for restricting the invention solely thereto. Instead, various modifications and variations are readily available and recognizable to the skilled person and, therefore, also considered as being part of the present invention. For instance, in one exemplary configuration, the hinge 22 can be replaced with a ball bearing. In another configuration, the spherical bearing 22a can be replaced with a hinge and the pivot bearing 22b can be replaced with a spherical or ball bearing, and so on.

Figure 2:
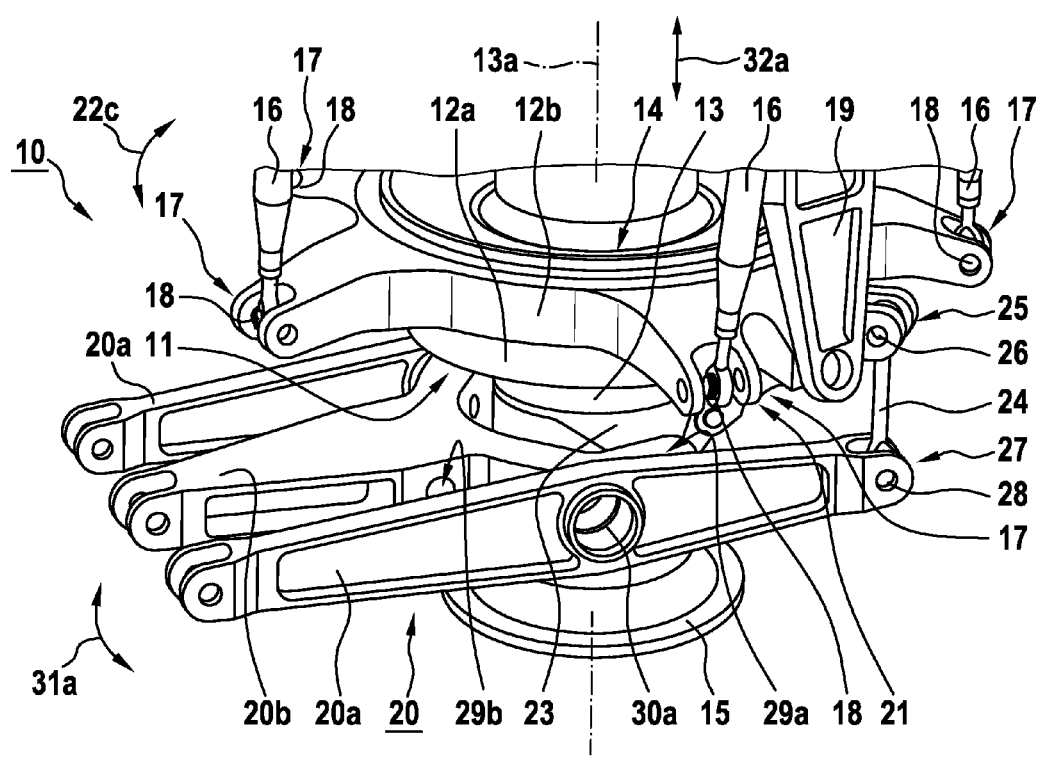
FIG. 2 shows a perspective view of the control system of FIG. 1, seen from a different viewing angle.

FIG. 2 shows the control system 10 of FIG. 1 for further illustrating the pivot connection between the at least one fork unit 20b and the mounting part 23 of the non-rotating sliding sleeve 13 at the corresponding mounting point 29a by means of an associated fork pivot bearing 29b, as well as the pivot connection between the at least one actuator arm 20a and the at least one fork unit 20b by means of the associated actuator arm pivot bearing 30a.

In operation of the control system 10, a pivot movement of the at least one fork unit 20b around the associated fork pivot bearing 29b into a pivoting direction 31a is translated into an axial displacement of the non-rotating sliding sleeve 13 and, thus, the swash plate assembly 11, into an axial displacement direction 32a along the associated sliding sleeve axis 13a. Thus, collective pitch of the rotor blades 1b, 1c of FIG. 1 can be controlled.

A pivot movement of the at least one actuator arm 20a around the associated actuator arm pivot bearing 30a into the pivoting direction 31a is translated via the associated swash plate control rods 24 into a tilting of the swash plate assembly 11 into the swash plate tilting directions 22c around the associated sliding sleeve axis 13a. Thus, cyclic pitch of the rotor blades 1b, 1c of FIG. 1 can be controlled.

Figure 3:
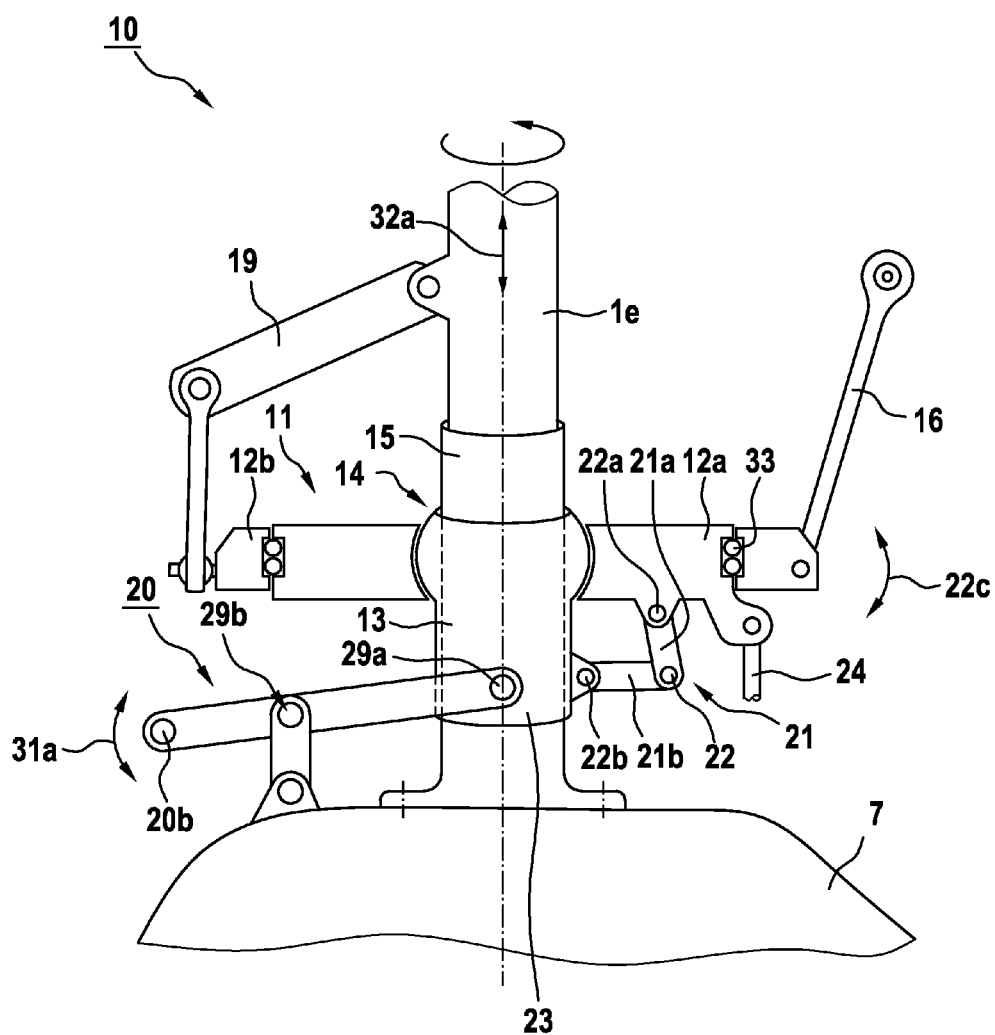
FIG. 3 shows a schematic side view of a simplified version of the control system of FIG. 1.

FIG. 3 shows a simplified schematic view of the control system 10 of FIG. 1 and FIG. 2 for further illustrating the possible pivoting directions 31a of the control input unit 20, the possible axial displacement directions 32a of the non-rotating sliding sleeve 13 and the possible swash plate tilting directions 22c of the swash plate assembly 11. FIG. 3 also illustrates the comparatively short and small configuration of the at least one non-rotating stop arm 21. FIG. 3 further illustrates an exemplary bearing of the at least one rotating plate 12b of the swash plate assembly 11 at its at least one non-rotating plate 12a by means of a roller bearing 33, in particular a ball bearing.

It should be noted that modifications to the above described embodiments are within the common knowledge of the person skilled in the art and, thus, also considered as being part of the present invention. For instance, various different implementations of the at least one non-rotating stop arm 21 can be considered. More specifically, due to the comparatively small tilting angles to which the swash plate assembly 11 is subjected in operation, a simplified non-rotating stop arm 21 can be implemented by means of composite material. Such a non-rotating stop arm that comprises composite material can be designed with less weight in a material saving manner and, thus, more cost-efficiently than a hinged non-rotating stop arm as described above.

REFERENCE LIST 1 rotary-wing aircraft
1a multi-blade rotor
1b, 1c rotor blades
1d rotor head
1e rotor shaft
1f rotor axis
2 fuselage
2a tail boom
2b cabin
3 counter-torque device
4 bumper 5 fin
5a tail wing
6 landing gear
7 main gear box
10 control system
11 swash plate assembly
12a non-rotating plate
12b rotating plate
13 non-rotating sliding sleeve
13a sliding sleeve axis
14 spherical bearing
15 non-rotating sliding sleeve guide
16 pitch control rods
17 rotating plate clevises
18 rotating plate ball joints
19 rotating arms
20 control input unit
20a outer actuator arms
20b inner fork
21 non-rotating stop arm
21a upper arm
21b lower arm
22 stop arm hinge
22a upper arm spherical bearing
22b lower arm pivot bearing
22c swash plate tilting directions
23 sliding sleeve mounting part
24 swash plate control rods
25 non-rotating plate clevises
26 non-rotating plate ball joints
27 actuator arm clevises
28 actuator arm ball joints
29a inner fork mounting point
29b inner fork pivot bearing
30a actuator arm pivot bearing
31a control input unit pivot movement directions
32a sliding sleeve movement directions
33 roller bearing

What is claimed is:

1. A control system for controlling collective and cyclic pitch of rotor blades of a multi-blade rotor in a rotary-wing aircraft, wherein the multi-blade rotor comprises a rotor shaft that defines an associated rotor axis, the control system comprising a swash plate assembly with at least one non-rotating plate and at least one rotating plate that is mounted rotatably to the at least one non-rotating plate, the at least one rotating plate and the at least one non-rotating plate being mounted to a non-rotating sliding sleeve that is adapted to be mounted axially displaceable parallel to the associated rotor axis on the rotor shaft, wherein a spherical bearing is provided on the non-rotating sliding sleeve, the at least one rotating plate being rotatable around an associated sliding sleeve axis and being mounted with the at least one non-rotating plate to the spherical bearing such that the at least one rotating plate and the at least one non-rotating plate are tiltable in any direction around the associated sliding sleeve axis by means of the spherical bearing, characterized in that at least one non-rotating stop arm is provided for non-rotatably connecting the at least one non-rotating plate to the non-rotating sliding sleeve in order to inhibit relative rotational movement around the associated sliding sleeve axis between the at least one non-rotating plate and the non-rotating sliding sleeve, the at least one non-rotating stop arm being mounted to the at least one non-rotating plate and to the non-rotating sliding sleeve.

2. The control system according to claim 1, wherein the at least one non-rotating stop arm comprises at least a first and a second stop arm section, the first stop arm section being connected to the second stop arm section by an associated stop arm hinge.

3. The control system according to claim 2, wherein the first stop arm section is mounted to the at least one non-rotating plate by means of an associated stop arm spherical bearing.

4. The control system according to claim 2, wherein the second stop arm section is mounted to the non-rotating sliding sleeve by means of an associated stop arm pivot bearing.

5. The control system according to claim 1, wherein a non-rotating sliding sleeve guide is provided, the non-rotating sliding sleeve being glidingly arranged on the non-rotating sliding sleeve guide.

6. The control system according to claim 5, wherein the rotor shaft of the multi-blade rotor extends through the non-rotating sliding sleeve guide.

7. The control system according to claim 5, wherein the non-rotating sliding sleeve guide is adapted for rigid fixation to a non-rotating part of the rotary-wing aircraft.

8. The control system according to claim 5, wherein the non-rotating sliding sleeve guide is adapted for rigid fixation to a main gear box of the rotary-wing aircraft.

9. The control system according to claim 1, wherein at least one fork unit is provided for controlling axial displacement of the non-rotating sliding sleeve in operation, the at least one fork unit being rotatably connected by means of a pivotable connection to a mounting part of the non-rotating sliding sleeve by means of an associated fork pivot bearing.

10. The control system according to claim 9, wherein the at least one non-rotating stop arm is mounted to the at least one non-rotating plate and to a fork mounting point or the associated fork pivot bearing.

11. The control system according to claim 9, wherein the at least one non-rotating stop arm is mounted to the at least one non-rotating plate and to the mounting part.

12. The control system according to claim 9, wherein at least one actuator arm is provided for controlling tilting of the at least one rotating plate and the at least one non-rotating plate in operation, the at least one actuator arm being pivotally connected to the at least one fork unit by means of an associated actuator arm pivot bearing.

13. The control system according to claim 12, wherein the at least one actuator arm is connected to the at least one non-rotating plate by means of associated swash plate control rods.

14. The control system according to claim 12, wherein the at least one actuator arm and the at least one fork unit define a control input unit.

15. The control system according to claim 12, wherein the at least one actuator arm and the at least one fork unit define a mixing lever gear unit.

16. The control system according to claim 1, wherein the at least one rotating plate is connected to each one of the rotor blades by means of an associated pitch control rod.

17. The control system according to claim 1, wherein the at least one rotating plate is rotatably connectable to the rotor shaft of the multi-blade rotor by means of at least one associated rotating arm in order to allow rotational movement of the at least one rotating plate together with the rotor shaft.

18. The control system according to claim 1, wherein the at least one rotating plate defines an upper swash plate and that the at least one non-rotating plate defines a lower swash plate of the swash plate assembly.

19. The control system according to claim 1, wherein the at least one non-rotating stop arm comprises composite material.

20. A rotary-wing aircraft with a multi-blade rotor having a plurality of rotor blades and a rotor shaft that defines an associated rotor axis, wherein a control system for controlling collective and cyclic pitch of the plurality of rotor blades is provided, the control system comprising a swash plate assembly with at least one non-rotating plate and at least one rotating plate that is mounted rotatably to the at least one non-rotating plate, the at least one rotating plate and the at least one non-rotating plate being mounted to a non-rotating sliding sleeve that is axially displaceable parallel to the rotor axis of the multi-blade rotor, wherein a spherical bearing is provided on the non-rotating sliding sleeve, the at least one rotating plate being rotatable around the rotor axis and being mounted with the at least one non-rotating plate to the spherical bearing such that the at least one rotating plate and the at least one non-rotating plate are tiltable in any direction around the rotor axis by means of the spherical bearing, characterized in that at least one non-rotating stop arm is provided for non-rotatably connecting the at least one non-rotating plate to the non-rotating sliding sleeve in order to inhibit relative rotational movement around the associated sliding sleeve axis between the at least one non-rotating plate and the non-rotating sliding sleeve, the at least one non-rotating stop arm being mounted to the at least one non-rotating plate and to the non-rotating sliding sleeve.

\* \* \* \* \*